(12) United States Patent
Geiss (10) Patent No.: US 12,179,611 B2
(45) Date of Patent: Dec. 31, 2024

(54) ELECTRICAL ENERGY STORAGE SYSTEM FOR AN AIRCRAFT

(71) Applicant: AIRBUS URBAN MOBILITY GMBH, Munich (DE)

(72) Inventor: Michael Geiss, Moettingen (DE)

(73) Assignee: AIRBUS URBAN MOBILITY GMBH, Munich (DE)

( * ) Notice: Subject to any disclaimer, the term of this patent is extended or adjusted under 35 U.S.C. 154(b) by 11 days.

(21) Appl. No.: 18/134,624

(22) Filed: Apr. 14, 2023

(65) Prior Publication Data

US 2023/0347754 A1    Nov. 2, 2023

(30) Foreign Application Priority Data

Apr. 29, 2022    (EP) ..................................... 22170734

(51) Int. Cl.
| | |
|---|---|
| *B60L 50/60* | (2019.01) |
| *B60L 3/00* | (2019.01) |
| *B60L 58/10* | (2019.01) |
| *B64D 27/24* | (2024.01) |
| *H02J 7/00* | (2006.01) |

(52) U.S. Cl.
CPC ............ *B60L 50/60* (2019.02); *B60L 3/0046* (2013.01); *B60L 58/10* (2019.02); *B64D 27/24* (2013.01); *H02J 7/0029* (2013.01); *H02J 7/0063* (2013.01); *B60L 2200/10* (2013.01)

(58) Field of Classification Search
CPC ........ B60L 50/60; B60L 58/10; B60L 3/0046; B60L 2200/10; B64D 27/24; H02J 7/0029; H02J 7/0063
See application file for complete search history.

(56) References Cited

U.S. PATENT DOCUMENTS

| | | |
|---|---|---|
| 5,826,958 A | 10/1998 | Avitan |
| 2020/0136406 A1 | 4/2020 | Suzuki et al. |
| 2022/0048622 A1 | 2/2022 | Wake et al. |

FOREIGN PATENT DOCUMENTS

| | | |
|---|---|---|
| CN | 112366790 A | 2/2021 |
| EP | 3939401 A1 | 1/2022 |
| WO | 2019211659 A1 | 11/2019 |

OTHER PUBLICATIONS

European Search Report for European Application No. EP 22170734. 2, Completed by the European Patent Office, Dated Oct. 6, 2022, 5 pages.

*Primary Examiner* — Carlos Amaya (74) *Attorney, Agent, or Firm* — BROOKS KUSHMAN P.C.

(57) ABSTRACT

An electrical energy storage system for an aircraft, comprising at least one electrical energy storage unit with power supply lines and an energy source that is configured to store electrical energy and to supply electrical power at a predetermined voltage range via the power supply lines, wherein the at least one electrical energy storage unit comprises a power switching unit that is adapted to operate in an associated supply mode for supplying electrical power from the energy source via the power supply lines, and to operate in an associated disconnect mode for disconnecting the energy source from the power supply lines.

20 Claims, 6 Drawing Sheets

ELECTRICAL ENERGY STORAGE SYSTEM FOR AN AIRCRAFT

CROSS-REFERENCE TO RELATED APPLICATIONS

This application claims priority to European patent application No. EP 22170734.2 filed on Apr. 29, 2022, the disclosure of which is incorporated in its entirety by reference herein.

TECHNICAL FIELD

The present disclosure relates to an electrical energy storage system for an aircraft, comprising at least one electrical energy storage unit with power supply lines and an energy source that is configured to store electrical energy and to supply electrical power at a predetermined voltage range via the power supply lines. The present disclosure further relates to an aircraft comprising such an electrical energy storage system.

BACKGROUND

Recently, a wide variety of aircrafts with electrical energy storage systems that are provided to power thrust producing units of the aircrafts are being developed for the emerging new market of urban air mobility (UAM). Due to flight and landing restrictions and conditions in urban areas, such aircrafts are generally embodied as Vertical Take-Off and Landing (VTOL) aircrafts and, more particularly, as electrical Vertical Take-Off and Landing (eVTOL) aircrafts.

More specifically, an eVTOL aircraft usually comprises an electrical energy storage system that is provided to power electrical engines with drive shafts that are attached to associated propellers in order to produce thrust/lift in response to rotation of the drive shafts. Therefore, a given electrical energy storage system includes at least one electrical energy storage unit with an energy source, and an electrical power distribution that supplies electrical power at a predetermined voltage range from the energy source to an associated electrical engine.

Various well-known eVTOL aircrafts, such as e.g., the CityAirbus of Airbus Helicopters, comprise a distributed arrangement of propellers and an associated distributed arrangement of electrical energy storage units in the electrical energy storage system. In such a distributed arrangement, different electrical energy storage units with respectively associated energy sources and electrical power distribution may be provided for powering different electrical engines and, thus, propellers. Each electrical energy storage unit with its associated energy source and electrical power distribution thereby forms an independent electrical power train. Furthermore, one or more separate power trains may be provided for each electrical engine/propeller and, thereby, form an electrical propulsion system (EPS) with respect to the electrical engine/propeller. In other words, each EPS may comprise one or more power trains.

Within each EPS of a given eVTOL aircraft, highest reliability and availability is required throughout all components of an underlying functional chain, as a malfunction or failure of a given EPS may lead to a partial or complete loss of thrust/lift generated by a propeller associated with the given EPS. As a result, an instability or degraded performance of the given eVTOL aircraft with potential catastrophic effects may occur.

In order to guarantee highest availability of an EPS, there is a particular constraint imposed on its electrical energy storage unit(s). More specifically, so-called high-power applications such as eVTOL aircrafts imply high power demand at respective electrical energy storage units. In order to achieve a required efficiency and for reducing power losses the electrical energy storage units are, therefore, usually embodied with high voltage direct current (DC) source outputs. These high voltage DC source outputs operate significantly above a respective so-called safety extra-low voltage such that e.g., direct contact from humans to conductive parts in an EPS, for instance by mistake or failure or high voltage insulation degradation, may result in human hazards, which are also referred to as high voltage hazards, such as skin burn, atrial fibrillation, heart attack, etc. As a consequence, there is a need for protective functions, which prevent in an EPS high voltage hazards to humans.

Illustrative protective functions provide an automated self-disconnection means at the EPS and, more particularly, at its electrical energy storage unit(s). Thus, each electrical energy storage unit may disconnect and isolate itself from associated power supply lines, e.g., in case of a detected misuse or failure event within the EPS, in order to protect and prevent humans from direct contact with a high voltage conductive part. However, there is a conflict of objectives, as on one side the availability and continued electrical discharge of the electrical energy storage unit is essential for continued electrical propulsion and thrust/lift generation, whereas on the other side high voltage hazards shall not endanger humans after a misuse or failure of the EPS, causing the need for a high voltage clearance/disconnection means.

As a consequence, it is well-known to provide a single manual safety switch that may be operated to act as a hardwired shutdown means to safely passivate energy sources, in particular high voltage energy sources, such as e.g., high voltage propulsion batteries, in an associated OFF-position. Furthermore, the single manual safety switch may e.g., be locked in the associated OFF-position against undesired switching, for instance by means of a mechanical locking or switch guard, in order to prevent erroneous switching from the OFF-position into an ON-position, in which the energy sources are activated, e.g., due to mishandling during ground operation.

For instance, such a single manual safety switch may directly act on internal main contactor coil supplies of coils of a given electrical energy storage unit. In such a configuration, disconnection of the internal main contactor coil supplies is leading to a "hard-wired" de-energizing of the coils, thus, opening resp. disengaging associated high voltage contactors. By opening resp. disengaging the high voltage contactors of the high voltage energy sources, a very robust and safe technical solution is provided to isolate the high voltage energy sources and, thus, to prevent undesired electrical motor run-up and risks associated with high voltage while humans are working close to the eVTOL aircraft, e.g., inside a hangar or at an airfield. Accordingly, personal safety on ground during ground operations, ground testing, maintenance, etc. may be guaranteed.

However, in discharge state of the electrical energy storage units of an eVTOL aircraft, e.g., in flight operation of the eVTOL aircraft, each single manual safety switch represents a single point of failure by itself. More specifically, according to current aeronautic safety databases/statistics a single discrete electrical switching device, such as an electromechanical switch, which may be used to implement a single manual safety switch, is generally afflicted by a risk of failure due to an event "loss of safety switch conductivity" with a magnitude of ~1*10E−7/FH, i.e., a magnitude of approximately 10−7 occurrences per flight hour. This means that a malfunction of a given single manual safety switch may occur in this order of magnitude with a potential risk of disconnecting an associated electrical energy storage unit of an eVTOL aircraft during flight operation, thus, potentially losing the eVTOL aircraft as a consequence of this malfunction.

While this risk of failure with a magnitude of ~1*10E−7/FH is rated as sufficient for an unmanned eVTOL aircraft, this risk of failure is, however, not acceptable for a manned eVTOL aircraft. Instead, for a manned eVTOL aircraft the risk of failure due to an event "loss of safety switch conductivity" should have a magnitude of less than 1*10E−9/FH as safety target, i.e., a magnitude of less than $10^{-9}$ occurrences per flight hour. More particularly, the European Union Aviation Safety Agency (EASA), for instance, has released a Special Condition for type certification of small category VTOL aircrafts (SC-VTOL-01) on Jul. 2, 2019, in which VTOL aircrafts that are certified in the category "Enhanced" would have to meet requirements for continued safe flight and landing, and be able to continue to the original intended destination or a suitable alternate vertiport after a failure. In the category "Enhanced", failure conditions that would prevent continued safe flight and landing of the aircraft are considered catastrophic. A quantitative safety objective in the category "Enhanced", therefore, determines that catastrophic failure conditions have to occur at a magnitude that is smaller than, or equal to, 1*10E−9/FH, i.e., $10^{-9}$ occurrences per flight hour.

In other words, for the category "Enhanced", a single failure must not have a catastrophic effect upon the eVTOL aircraft. As a consequence, provision of a single manual safety switch within a manned eVTOL aircraft does not comply with the applicable certification requirements for manned eVTOL aircrafts.

SUMMARY

It is, therefore, an object of the present disclosure to provide a new electrical energy storage system for an aircraft, in particular for a manned eVTOL aircraft. The new electrical energy storage system should have an improved fail-safe structure that prevents occurrence of catastrophic failure conditions of an associated manned eVTOL aircraft in flight operation to the greatest possible extent, but at least insofar as such catastrophic failure conditions have to occur at a magnitude that is smaller than, or equal to, 1*10E−9/FH, i.e., $10^{-9}$ occurrences per flight hour.

The object is solved by an electrical energy storage system comprising the features of claim 1. More specifically, an electrical energy storage system for an aircraft, comprising at least one electrical energy storage unit with power supply lines and an energy source that is configured to store electrical energy and to supply electrical power at a predetermined voltage range via the power supply lines is provided. The at least one electrical energy storage unit comprises a power switching unit that is adapted to operate in an associated supply mode for supplying electrical power from the energy source via the power supply lines, and to operate in an associated disconnect mode for disconnecting the energy source from the power supply lines. Furthermore, the at least one electrical energy storage unit comprises a driver enable stage that comprises at least a first enable channel and a second enable channel, wherein each one of the first enable channel and the second enable channel is adapted to operate in one of an enable mode and a disable mode; and a switch driver unit that is adapted to operate in one of an enable mode and a disable mode. The power switching unit is configured to operate in the supply mode if the switch driver unit and at least one of the first enable channel and the second enable channel are operated in enable mode. The power switching unit is further configured to operate in the disconnect mode if the switch driver unit is operated in disable mode, or if both the first enable channel and the second enable channel are operated in disable mode.

Advantageously, by providing the inventive electrical energy storage system for an aircraft with at least one electrical energy storage unit having the power switching unit, the switch driver unit and the driver enable stage that comprises at least first and second enable channels, an improved fail-safe structure may be provided that prevents occurrence of catastrophic failure conditions of an aircraft such as a manned eVTOL aircraft in flight operation to the greatest possible extent, but at least insofar as such catastrophic failure conditions may only occur at a magnitude that is smaller than, or equal to, 1*10E−9/FH, i.e., $10^{-9}$ occurrences per flight hour. Thus, highest availability of a respective discharge function of the at least one electrical energy storage unit may be guaranteed, while enabling highest safety and reliability at the implementation of a required personal safety functionality. These advantages are achieved with reduced overall system complexity and, thus, reduced development efforts and costs.

In other words, in the inventive electrical energy storage system not only the requirement for availability of the at least one electrical energy storage unit for the discharge function, i.e., to ensure presence of high voltage on the power supply lines e.g., in flight operation of an aircraft to which the electrical energy storage system is mounted, is fulfilled, but also the requirement for absence of the high voltage on the power supply lines e.g., during ground operations is fulfilled, thus, guaranteeing personal safety e.g., during maintenance actions when people are working on the aircraft. These two as such contradictory critical requirements may easily be fulfilled at the same time by simple means, e.g., by hardwired/discrete electronic means, i.e., without any microcontroller/software in the loop.

More specifically, in an illustrative realization of the electrical energy storage system according to the present disclosure the driver enable stage as part of the at least one electrical energy storage unit of the electrical energy storage system generates an output that acts directly on the power switching unit associated with the energy source of the at least one electrical energy storage unit. For instance, the output may directly act on a first power switching device "switching_device1" provided as a high voltage (HV) contactor at a plus pole of the energy source, and on a second power switching device "switching_device2" provided as another HV contactor at a minus pole of the energy source, wherein the first and second power switching devices form the power switching unit. Furthermore, the driver enable stage as such may comprise a diode network with at least two diodes or a functionally equivalent circuitry to implement at least a first enable channel "Z1" and a second enable channel "Z2" for external connection of the at least one electrical energy storage unit on an input side of the driver enable stage via at least one first driver input channel and one second driver input channel. Therein, the at least two diodes, or the functionally equivalent circuitry, are provided for the purpose of electrical segregation between the at least one first and second driver input channels. Moreover, the switch driver unit as part of the at least one electrical energy storage unit of the electrical energy storage system generates an output that acts likewise directly on the power switching unit associated with the energy source of the at least one electrical energy storage unit. For instance, this output may be a close/open signal "Y" for the power switching unit, such as e.g., a first close/open signal "Y1" for the first power switching device and a second close/open signal "Y2" for the second power switching device.

As a result, a fail-safe logic may be implemented such that the output of the driver enable stage enables closure of the first and second power switching devices to enable operation of the power switching unit in supply mode, if at least one of the first and second enable channels at the driver enable stage is activated (e.g., Z1=TRUE and/or Z2=TRUE). However, for actually closing the first and second power switching devices to actually operate the power switching unit in supply mode, the switch driver unit must preferably send a close signal (e.g., Y=TRUE) to the power switching unit. More specifically, the switch driver unit must e.g., send a first close signal (e.g., Y1=TRUE) to the first power switching device and a second close signal (e.g., Y2=TRUE) to the second power switching device to actually operate the power switching unit in supply mode. In other words, in the given example the first and second power switching devices and, thus, the power switching unit, are/is operated in supply mode if:

for switching_device1: (Z1 ∨ Z2) ∧ Y1, and
for switching_device2: (Z1 ∨ Z2) ∧ Y2.

In order to enable implementation of the above-described fail-safe logic, at least two external independent trigger sources (e.g., trigger source "A" and trigger source "B") may be connected to the driver enable stage. Preferably, the first trigger source A is of a different kind, dissimilar and redundant from the second trigger source B. If at least one of the at least two external trigger sources A, B is enabled (e.g., A=TRUE or B=TRUE), this may advantageously be sufficient to unlock and enable the switch driver unit to close the power switching unit and, thus, to operate the latter in supply mode. However, in a critical operational mode at which the availability of the power supply of the energy source of the at least one electrical energy storage unit is essential, e.g., for a continued safe flight operation of a respective aircraft to which the electrical energy storage system is mounted, the trigger sources A, B are preferably both permanently enabled (e.g., A=TRUE and B=TRUE).

As a result, increased availability and failure robustness may be achieved for a respective discharge function of the at least one electrical energy storage unit, i.e., its function to provide electrical HV power. Nevertheless, in modes which are critical for personal safety (e.g., maintenance actions), respective priorities may securely and reliably be shifted away from increased availability to increased HV isolation safety by disabling both trigger sources A, B (e.g., A=FALSE and B=FALSE). Thus, a respective steering autonomy of the switch driver unit of the at least one electrical energy storage unit to close the power switching devices of the power switching unit may be deactivated and, as a consequence, critical undesired HV engagement may be prevented.

According to some aspects of the present disclosure, the electrical energy storage system comprises a first trigger source that is connected to the first enable channel, and a second trigger source that is connected to the second enable channel; wherein the first trigger source is configured to switch the first enable channel between enable mode and disable mode; and wherein the second trigger source is configured to switch the second enable channel between enable mode and disable mode.

Preferably, the first enable channel comprises a first diode or a functionally equivalent circuitry, and the first trigger source comprises a first safety switch; and the second enable channel comprises a second diode or a functionally equivalent circuitry, and the second trigger source comprises a second safety switch.

According to some aspects of the present disclosure, the first and second enable channels are provided for external connection of the at least one electrical energy storage unit on an input side of the driver enable stage via associated first and second driver input channels. Therein, the first and second diodes, or the respective functionally equivalent circuitry, are provided for the purpose of electrical segregation between the associated first and second driver input channels.

Preferably, the first enable channel is enabled if the first safety switch is in closed state, and disabled if the first safety switch is in opened state; and the second enable channel is enabled if the second safety switch is in closed state, and disabled if the second safety switch is in opened state. By way of example, the first diode may be conducting if the first safety switch is in closed state, and non-conducting if the first safety switch is in opened state; and the second diode may be conducting if the second safety switch is in closed state, and non-conducting if the second safety switch is in opened state.

Preferably, the second trigger source further comprises a discrete command unit; and the second safety switch is a safety relay.

According to one aspect, the first safety switch may likewise be a safety relay. Alternatively, the first and/or second safety switches may be manual switches. More generally, each one of the first and second safety switches may be implemented based on one or more of manual electro-mechanical switching, relay switching, and/or semiconductor switching principles, and each non-manual safety switch may be steered by a discrete command unit.

Preferably, the discrete command unit is embodied by means of a flight management system or protection logic of an aircraft to which the electrical energy storage system is mounted.

Preferably, the discrete command unit is configured to switch the safety relay between closed state and opened state on the basis of current operating conditions of an aircraft to which the electrical energy storage system is mounted.

By way of example, the current operating conditions may encompass aircraft states and personal safety protection states.

Preferably, the first trigger source further comprises an impact switch that is configured to switch the first enable channel to disable mode in response to detection of an impact on the first trigger source.

For instance, a respective impact may occur as a result of an aircraft crash.

Preferably, the second trigger source further comprises an impact switch that is configured to switch the second enable channel to disable mode in response to detection of an impact on the second trigger source.

For instance, a respective impact may occur as a result of an aircraft crash.

Preferably, the electrical energy storage system further comprises a discharge control function unit that is connected to the switch driver unit and adapted to command the switch driver unit to operate either in enable mode or disable mode.

Preferably, the discharge control function unit is configured to command the switch driver unit on the basis of predetermined operating conditions of an aircraft to which the electrical energy storage system is mounted.

By way of example, the predetermined operating conditions may encompass aircraft states and personal safety protection states.

Preferably, the discharge control function unit is embodied by means of a battery management system associated with the energy source.

Preferably, the power switching unit comprises at least one power switching device with a magnetic switch and an associated switch control coil; wherein the magnetic switch is arranged in one of the power supply lines; and wherein the associated switch control coil is connected to the switch driver unit, the first enable channel, and the second enable channel.

Alternatively, the at least one power switching device may be implemented using another electro-mechanical switching device, such as e.g., one or more relays. Still alternatively, the at least one power switching device may be implemented using other kinds of switching devices, such as e.g., semiconductor switches such as transistors, MOS-FET, IGBT, etc. with dedicated control circuits adapted to a respectively selected technology, for instance a gate driver stage for MOS-FET and so on.

Preferably, the magnetic switch is closed in supply mode of the power switching unit by means of the associated switch control coil.

The present disclosure further relates to an aircraft, in particular an eVTOL aircraft, comprising an electrical energy storage system as described above.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

Exemplary embodiments may be included in any application that includes an electrical energy storage system and an electrical engine that is powered by the electrical energy storage system. The electrical engine may perform safety-critical operations, e.g., under predetermined circumstances (e.g., when operating under certain conditions), at predetermined times (e.g., at predetermined time intervals), or exclusively (i.e., under any condition and at all times).

DETAILED DESCRIPTION

Figure 1:
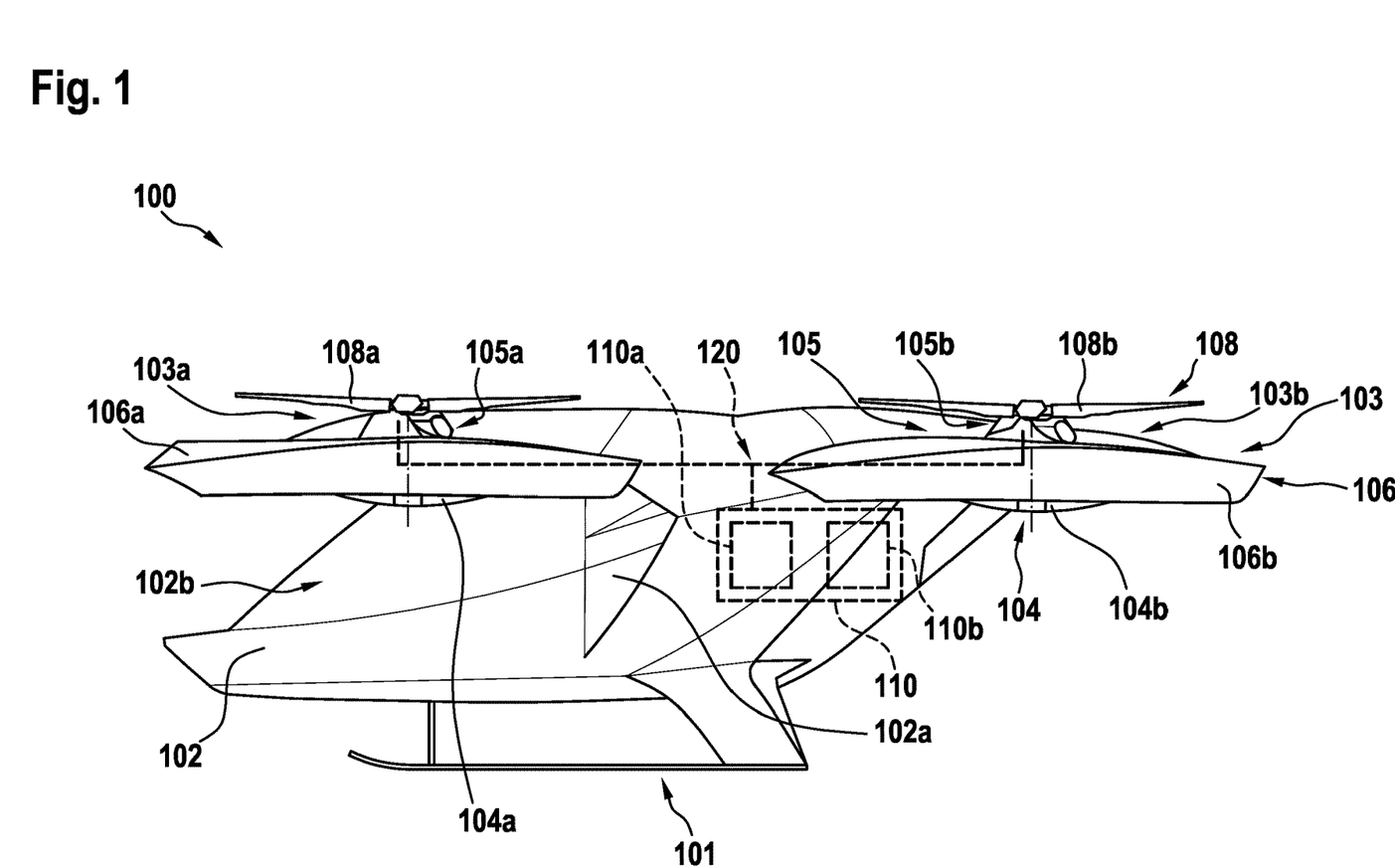
FIG. 1 shows a side view of an illustrative aircraft with an electrical energy storage system according to the present disclosure.

FIG. 1 shows an illustrative aircraft 100. By way of example, the aircraft 100 is embodied as a rotary-wing aircraft and, more particularly, as an eVTOL aircraft. Accordingly, the transportation vehicle 100 is hereinafter referred to as "the eVTOL 100" for simplicity and clarity.

eVTOL 100 has an airframe 102 that defines a supporting structure of the eVTOL 100 and that is also referred to hereinafter as "the fuselage 102" of the eVTOL 100. The fuselage 102 is illustratively provided with an outer shell 102a that defines an internal volume 102b. The internal volume 102b is preferably adapted for the transportation of passengers, so that the eVTOL 100 as a whole is adapted for transportation of passengers. Moreover, the internal volume 102b may be adapted for accommodating operational and electrical equipment, such as e.g., an electrical energy storage system 110 that is required for operation of the eVTOL 100.

It should be noted that exemplary configurations of the internal volume 102b that are suitable for transportation of passengers, but also for accommodation of operational and electrical equipment, are readily available to the person skilled in the art and generally implemented to comply with applicable authority regulations and certification requirements regarding passenger transportation. Thus, these configurations of the internal volume 102b are not described in detail, for brevity and conciseness.

Furthermore, it should be noted that the eVTOL 100 illustratively comprises a landing gear 101 of the skid-type. However, other types of landing gears are also readily available to the person skilled in the art and, therefore, likewise considered.

By way of example, the eVTOL 100 comprises a predetermined number of thrust producing units 103. Preferably, the predetermined number of thrust producing units 103 comprises at least two thrust producing units, i.e., the predetermined number of thrust producing units 103 may comprise two or more than two thrust producing units, such as e.g., three, four, or more thrust producing units.

Illustratively, the predetermined number of thrust producing units 103 comprises four thrust producing units which are, by way of example, all arranged laterally with respect to the fuselage 102. More specifically, two of the four thrust producing units are labelled with the reference signs 103a, 103b and illustratively arranged on the port side of the eVTOL 100. However, in FIG. 1 only the thrust producing units 103a, 103b are visible, while the other two thrust producing units of the four thrust producing units are masked by the fuselage 102 and the thrust producing units 103a, 103b. The thrust producing units 103a, 103b are embodied for producing thrust in a predetermined direction in operation such that the eVTOL 100 is able to hover in the air as well as to fly in any forward, rearward or sideward direction.

Illustratively, the predetermined number of thrust producing units 103 is structurally connected to a predetermined number of structural supports 104. By way of example, each one of the thrust producing units 103a, 103b is structurally connected to an associated structural support member 104a, 104b, respectively. Illustratively, the predetermined number of structural supports 104 and the predetermined number of thrust producing units 103 form a thrust producing units arrangement.

By way of example, one or more of the predetermined number of thrust producing units 103 may comprise an associated shrouding in order to improve underlying aerodynamics and to increase operational safety. Illustratively, a plurality of shrouding units 106 is shown with two separate shroudings 106a, 106b, wherein, by way of example, the shrouding 106a is associated with the thrust producing unit 103a, and the shrouding 106b with the thrust producing unit 103b.

If desired, the plurality of shrouding units 106 units may be connected to the predetermined number of structural supports 104. More specifically, the shrouding 106a is preferably connected to the structural support member 104a, and the shrouding 106b to the structural support member 104b.

According to one aspect, at least one and, preferably, each one of the thrust producing units 103a, 103b is equipped with at least one rotor assembly. By way of example, the thrust producing unit 103a is equipped with a rotor assembly 108a, and the thrust producing unit 103b is equipped with a rotor assembly 108b. The rotor assembly 108a may comprise a first rotor unit that is arranged inside of the shrouding 106a, and another rotor unit that is arranged above the shrouding 106a, as illustrated. Similarly, the rotor assembly 108b may comprise a first rotor unit that is arranged inside of the shrouding 106b, and another rotor unit that is arranged above the shrouding 106b, as illustrated. The rotor assemblies 108a, 108b illustratively define a plurality of rotor assemblies 108, which is preferably mounted to the plurality of shrouding units 106.

Preferably, the plurality of rotor assemblies 108 is powered by an associated plurality of engines 105 which, in the eVTOL 100, is embodied as a plurality of electrical engines. Illustratively, the rotor assembly 108a is powered by an electrical engine 105a of the plurality of electrical engines 105, and the rotor assembly 108b is powered by an electrical engine 105b of the plurality of electrical engines 105.

The plurality of electrical engines 105 is preferably powered by the electrical energy storage system 110 via an associated electrical power distribution 120 that supplies electrical power provided by at least one electrical energy storage unit of the electrical energy storage system 110 to the plurality of electrical engines 105. By way of example, the electrical energy storage system 110 comprises a first electrical energy storage unit 110a and a second electrical energy storage unit 110b.

However, it should be noted that a suitable electrical power distribution that may be used to implement the electrical power distribution 120 is well-known to the person skilled in the art and, as such, not part of the present disclosure. Therefore, a detailed description of the electrical power distribution 120 is omitted, for brevity and conciseness.

The electrical power distribution 120, the electrical energy storage system 110, the plurality of electrical engines 105, and the plurality of rotor assemblies 108 illustratively form a plurality of electrical propulsion systems. Each electrical propulsion system of the plurality of electrical propulsion systems may comprise one or more electrical power trains, wherein each electrical power train includes at least one of the electrical energy storage units of the electrical energy storage system 110 and at least one of the plurality of electrical engines 105. For instance, a first electrical power train may comprise the first electrical energy storage unit 110a of the electrical energy storage system 110 and the electrical engine 105a, and a second electrical power train may comprise the second electrical energy storage unit 110b of the electrical energy storage system 110 and the electrical engine 105b.

Figure 2:
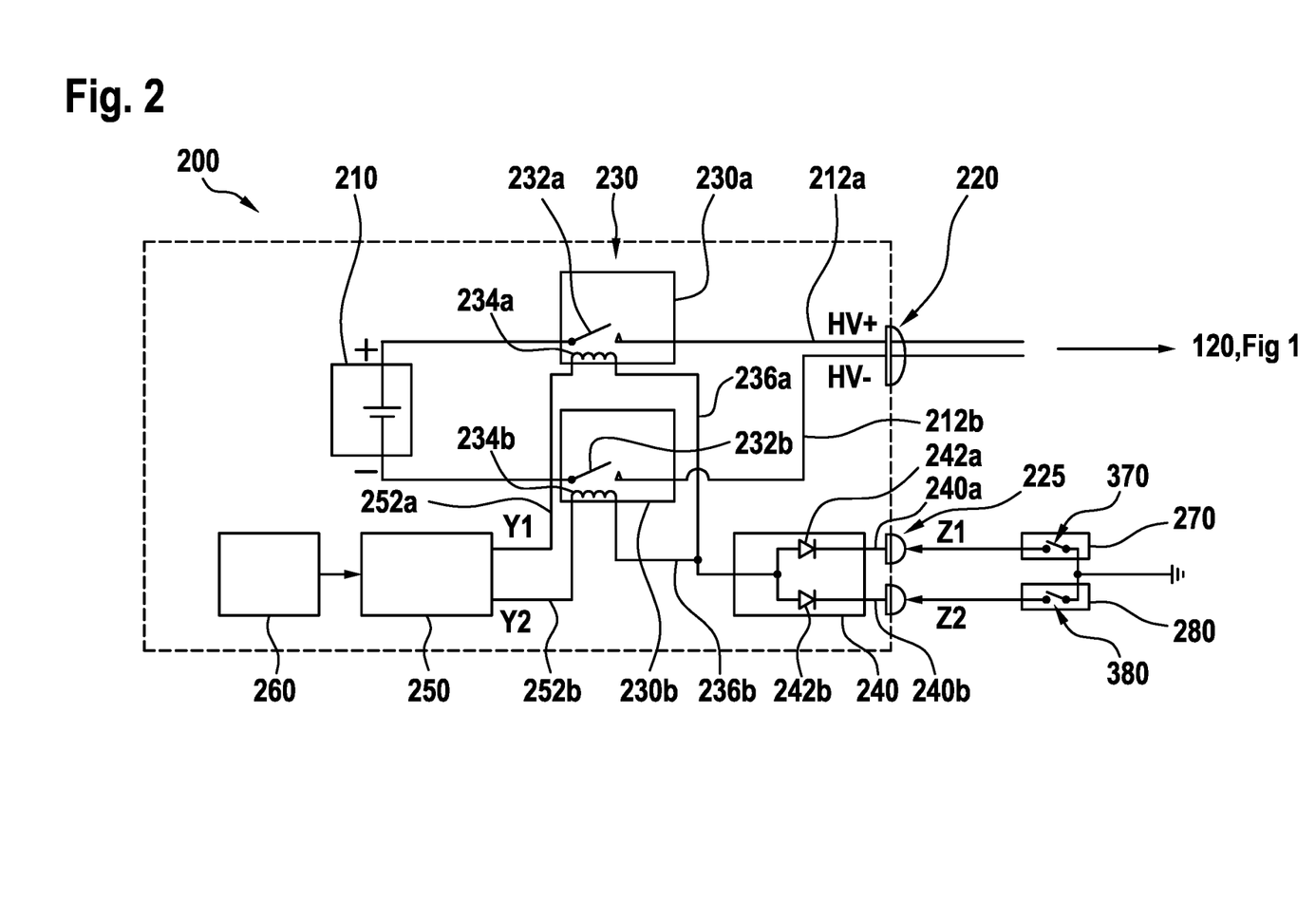
FIG. 2 shows an electrical energy storage unit according to the present disclosure.

FIG. 2 shows an illustrative electrical energy storage unit 200 which may preferably be used to implement the electrical energy storage unit 110a of FIG. 1 and/or the electrical energy storage unit 110b of FIG. 1. The electrical energy storage unit 200 comprises at least one energy source 210 that is configured to store electrical energy, as well as associated power supply lines 212a, 212b for supplying electrical power from the at least one energy source 210 at a predetermined voltage range, preferably at a HV range.

By way of example, only a single energy source is shown so that the at least one energy source 210 is referred to hereinafter as "the energy source 210", for simplicity and clarity. Illustratively, the at least one electrical energy storage unit 200 further comprises at least a power switching unit 230, a driver enable stage 240, and a switch driver unit 250.

The power switching unit 230 is preferably adapted to operate in an associated supply mode for supplying electrical power from the energy source 210 via the power supply lines 212a, 212b, and to operate in an associated disconnect mode for disconnecting the energy source 210 from the power supply lines 212a, 212b. Illustratively, the power switching unit 230 is arranged between the energy source 210 and the power supply lines 212a, 212b. The power supply lines 212a, 212b, in turn, may be connected via associated contact terminals HV+, HV− of a power interface 220 to an electrical power distribution, e.g., to the electrical power distribution 120 of the eVTOL 100 of FIG. 1, to which the electrical energy storage unit 200 may be mounted.

More specifically, the power switching unit 230 preferably comprises at least one power switching device. By way of example, the power switching unit 230 comprises a first power switching device 230a which is illustratively arranged between a plus pole of the energy source 210 and the power supply line 212a, and a second power switching device 230b which is illustratively arranged between a minus pole of the energy source 210 and the power supply line 212b.

Preferably, the power switching unit 230 operates either in the supply mode or the disconnect mode dependent on current operation modes of the switch driver unit 250 and the driver enable stage 240, which illustratively comprises at least a first enable channel 242a and a second enable channel 242b. Each one of the enable channels 242a, 242b is preferably adapted to operate in one of an enable mode and a disable mode. Similarly, the switch driver unit 250 is preferably also adapted to operate in one of an enable mode and a disable mode.

More specifically, the power switching unit 230 is preferably configured to operate in the supply mode if the switch driver unit 250 is operated in enable mode and if at least one, or both, of the enable channels 242a, 242b of the driver enable stage 240 are operated in enable mode. The power switching unit 230 is preferably further configured to operate in the disconnect mode if the switch driver unit 250 is operated in disable mode, or if both enable channels 242a, 242b of the driver enable stage 240 are operated in disable mode.

The driver enable stage 240 is preferably connected to associated trigger sources 270, 280, e.g., via a suitable trigger interface 225. Illustratively, the trigger source 270 is connected to the enable channel 242a of the driver enable stage 240, preferably via the trigger interface 225 and a driver input channel 240a. The trigger source 270 is preferably configured to switch the enable channel 242a between enable mode and disable mode. Illustratively, the trigger source 270 issues a trigger command Z1 that may e.g., be TRUE to switch the enable channel 242a to enable mode, and FALSE to switch the enable channel 242a to disable mode. Similarly, the trigger source 280 is connected to the enable channel 242*b* of the driver enable stage 240, preferably via the trigger interface 225 and a driver input channel 240*b*. The second trigger source 280 is preferably configured to switch the enable channel 242*b* between enable mode and disable mode. Illustratively, the trigger source 280 issues a trigger command Z2 that may e.g., be TRUE to switch the enable channel 242*b* to enable mode, and FALSE to switch the enable channel 242*b* to disable mode.

Preferably, both trigger commands Z1, Z2 are set to TRUE, i.e., Z1=TRUE and Z2=TRUE, for switching both enable channels 242*a*, 242*b* of the driver enable stage 240 to enable mode, if the availability of the power supply of the energy source 210 via the power supply lines 212*a*, 212*b* is critical or essential. Thus, increased availability and failure robustness may be achieved for a respective discharge function of the electrical energy storage unit 200, i.e., its function to provide electrical HV power. However, if increased HV isolation safety is required instead, both trigger commands Z1, Z2 are preferably set to FALSE, i.e., Z1=FALSE and Z2=FALSE, for switching both enable channels 242*a*, 242*b* of the driver enable stage 240 to disable mode such that critical undesired HV engagement via the power supply lines 212*a*, 212*b* may be prevented.

Illustratively, the driver enable stage 240, i.e., the enable channels 242*a*, 242*b*, and the switch driver unit 250 are connected to the power switching unit 230. By way of example, the switch driver unit 250 and the enable channels 242*a*, 242*b* are connected to the power switching devices 230*a*, 230*b*, respectively.

The switch driver unit 250 is illustratively further connected to a discharge control function unit 260 that is adapted to command the switch driver unit 250 to operate either in enable mode or disable mode. For instance, the discharge control function unit 260 may be configured to command the switch driver unit 250 on the basis of predetermined operating conditions of an aircraft, e.g., the eVTOL 100 of FIG. 1, to which the electrical energy storage unit 200 may be mounted. By way of example, the predetermined operating conditions may encompass aircraft states and personal safety protection states. In this case, the discharge control function unit 260 may be embodied by means of a battery management system associated with the energy source 210. However, a suitable battery management system is well-known to the person skilled in the art and, as such, not part of the present disclosure. Therefore, a detailed description of the battery management system is omitted, for brevity and conciseness.

By way of example, the switch driver unit 250 generates a driver output signal for the power switching unit 230. Illustratively, the switch driver unit 250 generates a first driver output signal Y1 for the power switching device 230*a*, and a second driver output signal Y2 for the power switching device 230*b*. The driver output signals Y1, Y2 may e.g., be TRUE if the switch driver unit 250 operates in enable mode, and FALSE if the switch driver unit 250 operates in disable mode.

In the illustrated realization example, the power switching devices 230*a*, 230*b*, the driver enable stage 240, and the switch driver unit 250 implement a fail-safe logic such that the driver enable stage 240 enables operation of the power switching devices 230*a*, 230*b* in supply mode, if at least one of the enable channels 242*a*, 242*b* of the driver enable stage 240 is operated in enable mode, e.g., Z1=TRUE and/or Z2=TRUE, and if in addition the switch driver unit 250 is also operated in enable mode, e.g., Y1=TRUE and Y2=TRUE. In other words, the power switching devices 230*a*, 230*b* are both operated in supply mode if:

(Z1 V Z2) ∧ Y1=TRUE, and
(Z1 V Z2) ∧ Y2=TRUE.

It should be noted that FIG. 2 further exemplifies illustrative configurations of the power switching devices 230*a*, 230*b*, the driver enable stage 240, and the trigger sources 270, 280, as described hereinafter. However, various other configurations are within the knowledge of the person skilled in the art and, therefore, likewise contemplated.

More specifically, at least one of the power switching devices 230*a*, 230*b* may be implemented as an electro-mechanical switching device with a magnetic switch and a switch control coil, wherein the magnetic switch is arranged in the associated one of the power supply lines, and wherein the switch control coil is connected to the driver enable stage 240 and the switch driver unit 250. However, it should be noted that the at least one of the power switching devices 230*a*, 230*b* may alternatively be implemented using another electro-mechanical switching device, such as e.g., one or more relays. Still alternatively, the at least one of the power switching devices 230*a*, 230*b* may be implemented using other kinds of switching devices, such as e.g., semi-conductor switches such as transistors, MOS-FET, IGBT, etc. with dedicated control circuits adapted to a respectively selected technology, for instance a gate driver stage for MOS-FET, and so on.

By way of example, the power switching device 230*a* comprises a magnetic switch 232*a*, e.g., a contactor, and a switch control coil 234*a*, e.g., a contactor coil. Similarly, the power switching device 230*b* comprises a magnetic switch 232*b*, e.g., a contactor, and a switch control coil 234*b*, e.g., a contactor coil.

Illustratively, the magnetic switch 232*a* is arranged in the power supply line 212*a* and the switch control coil 234*a* is connected via a driver output line 252*a* to the switch driver unit 250 and via a coil return line 236*a* to both enable channels 242*a*, 242*b*. Thus, the switch driver unit 250 may transmit the driver output signal Y1 via the driver output line 252*a* to the switch control coil 234*a*, where the trigger commands Z1, Z2 from the driver enable stage 240 are applied via the enable channels 242*a*, 242*b* and the coil return line 236*a*. Similarly, the magnetic switch 232*b* is arranged in the power supply line 212*b* and the switch control coil 234*b* is connected via a driver output line 252*b* to the switch driver unit 250 and via a coil return line 236*b* to both enable channels 242*a*, 242*b*. Thus, the switch driver unit 250 may transmit the driver output signal Y2 via the driver output line 252*b* to the switch control coil 234*b*, where the trigger commands Z1, Z2 from the driver enable stage 240 are applied via the enable channels 242*a*, 242*b* and the coil return line 236*b*. Preferably, the magnetic switches 232*a*, 232*b* are closed in supply mode of the power switching unit 230 by means of the switch control coils 234*a*, 234*b*, i.e., if the switch driver unit 250 operates in enable mode.

Furthermore, the enable channel 242*a* illustratively comprises a first diode, or another functionally equivalent circuitry, for the purpose of electrical segregation between the driver input channels 240*a* and 240*b*, and the trigger source 270 comprises a first safety switch 370. Similarly, the enable channel 242*b* comprises a second diode, or another functionally equivalent circuitry, for the purpose of electrical segregation between the driver input channels 240*a* and 240*b*, and the trigger source 280 comprises a second safety switch 380. Preferably, the enable channel 242*a* is enabled if the safety switch 370 is in closed state, and disabled if the safety switch 370 is in opened state. For instance, the first diode may be conducting if the safety switch 370 is in closed state, i.e., if the enable channel 242a operates in enable mode, and non-conducting if the safety switch 370 is in opened state, i.e., if the enable channel 242a operates in disable mode. Similarly, the enable channel 242b is preferably enabled if the safety switch 380 is in closed state, and disabled if the safety switch 380 is in opened state. For instance, the second diode may be conducting if the safety switch 380 is in closed state, i.e., if the enable channel 242b operates in enable mode, and non-conducting if the second safety switch 380 is in opened state, i.e., if the enable channel 242b operates in disable mode.

Each one of the safety switches 370, 380 may be implemented as a manual switch or a safety relay. However, other switching principles such as manual electro-mechanical switching, relay switching, and/or semiconductor switching principles may likewise be applied.

Figure 3:
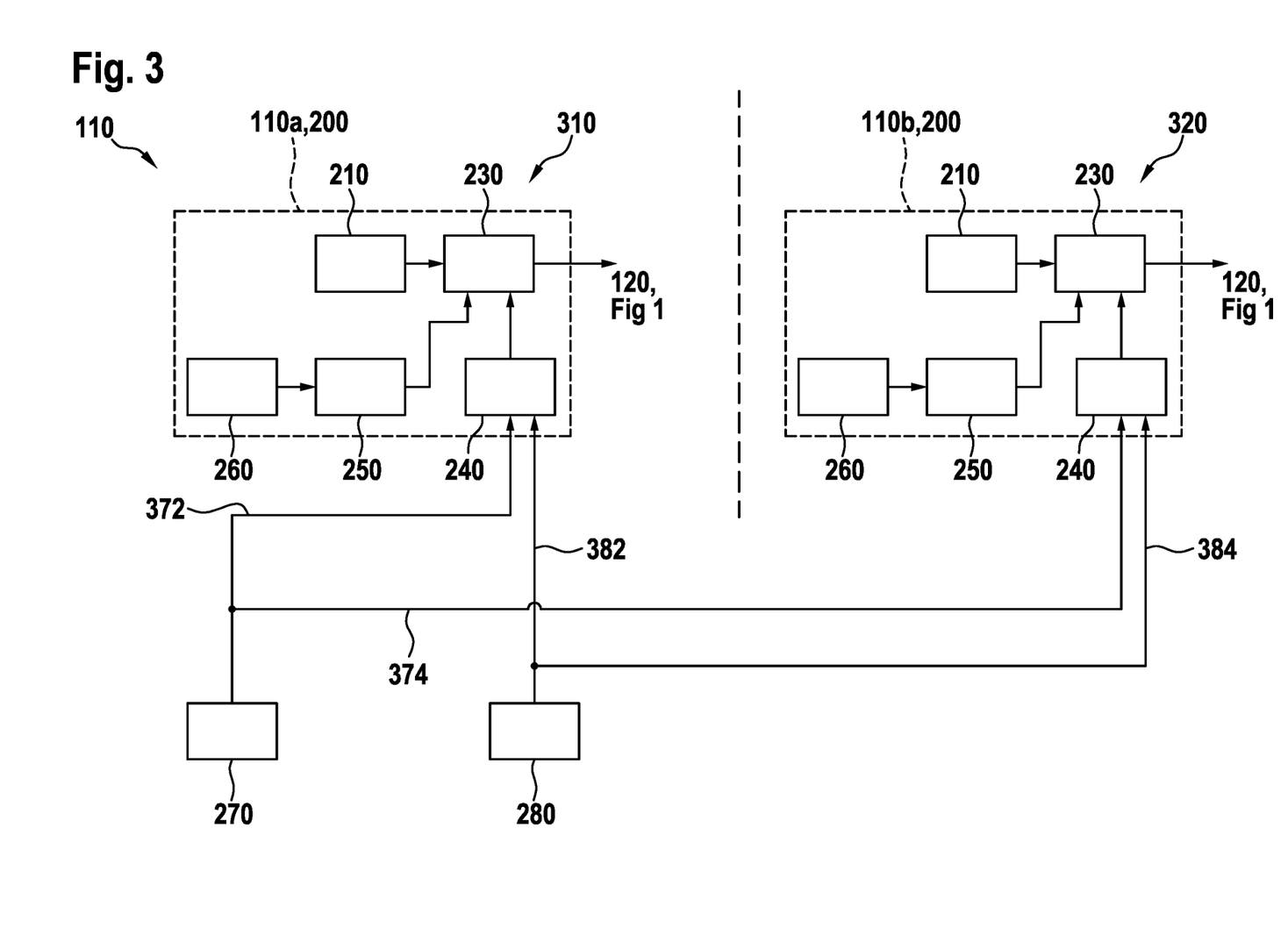
FIG. 3 shows an electrical energy storage system with two electrical energy supply channels according to an aspect of the present disclosure.

FIG. 3 shows the electrical energy storage system 110 with the electrical energy storage units 110a, 110b of FIG. 1, which are illustratively connected to the electrical power distribution 120 of FIG. 1. By way of example, each one of the electrical energy storage units 110a, 110b is embodied according to the electrical energy storage unit 200 of FIG. 2. The electrical energy storage unit 110a is integrated into a first electrical energy supply channel 310, which may e.g., be part of a first electrical propulsion system (EPS), and the electrical energy storage unit 110b is integrated into a second electrical energy supply channel 320, which may e.g., be part of a second electrical propulsion system (EPS).

For purposes of illustration, each one of the electrical energy storage units 110a, 110b comprises the energy source 210, the power switching unit 230, the driver enable stage 240, the switch driver unit 250, and the discharge control function unit 260 of FIG. 2. However, it should be noted that in accordance to the explanations above at FIG. 2, the respective configurations of these components are not further detailed at FIG. 3, as various different configurations are contemplated and readily available to the person skilled in the art.

Furthermore, in contrast to FIG. 2 the trigger sources 270, 280 are now connected to the driver enable stages 240 of both electrical energy storage units 200, so that there are no dedicated trigger sources for each one of the electrical energy supply channels 310, 320. In other words, the trigger sources 270, 280 are illustratively connected via associated connection lines 372, 382 to the driver enable stage 240 of the electrical energy storage unit 110a, and also via associated connection lines 374, 384 to the driver enable stage 240 of the electrical energy storage unit 110b. Again, it should be noted that in accordance to the explanations above at FIG. 2, the respective configurations of the trigger sources 270, 280 are not further detailed at FIG. 3, as various different configurations are contemplated and readily available to the person skilled in the art.

Figure 4:
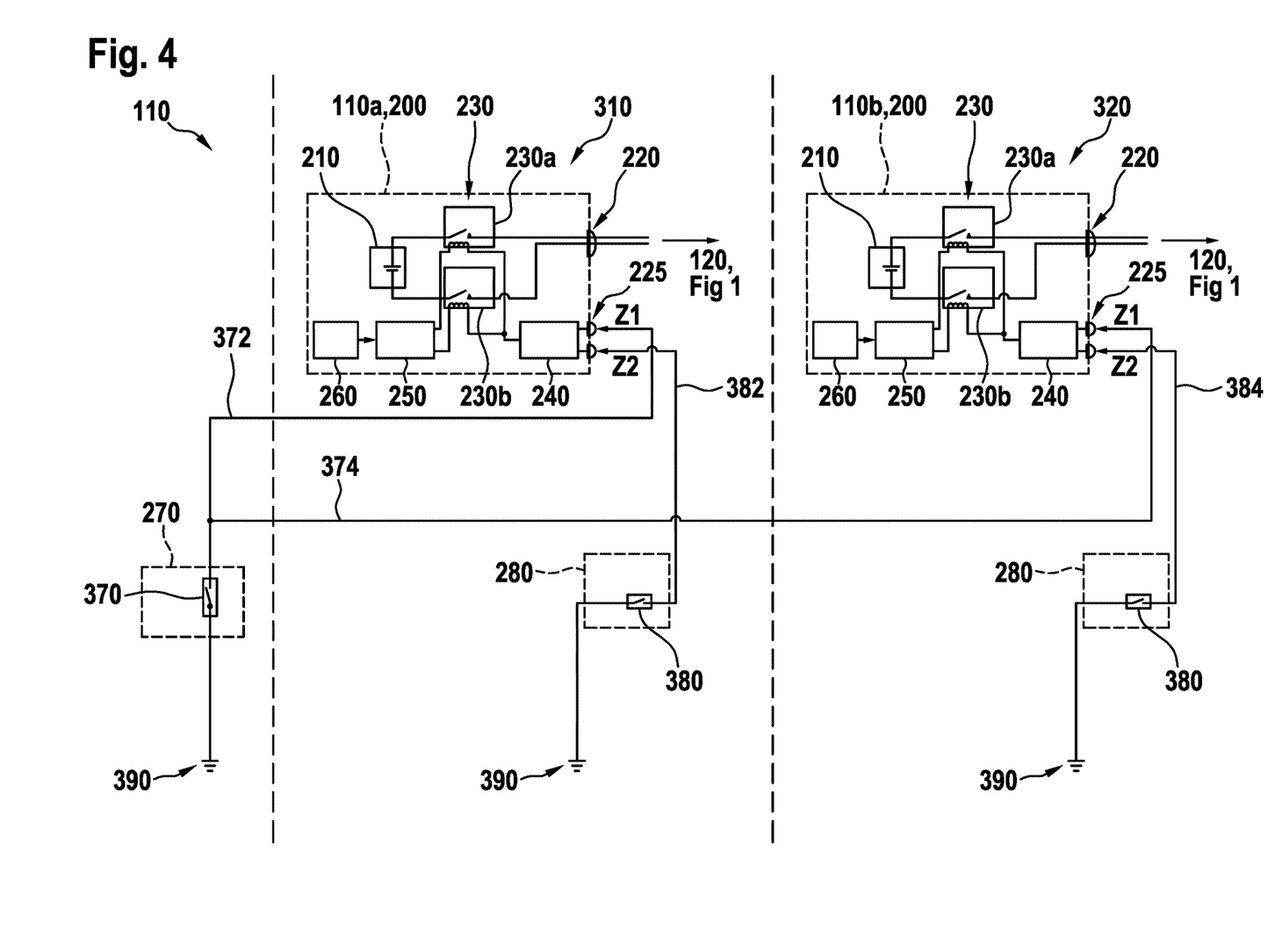
FIG. 4 shows an electrical energy storage system with two electrical energy supply channels according to a first variant.

FIG. 4 shows the electrical energy storage system 110 with the electrical energy storage units 110a, 110b of FIG. 1 and FIG. 3, which are illustratively connected to the electrical power distribution 120 of FIG. 1. In accordance with FIG. 2, each one of the electrical energy storage units 110a, 110b is embodied according to the electrical energy storage unit 200 of FIG. 2 and, in accordance with FIG. 3, the electrical energy storage unit 110a is integrated into the electrical energy supply channel 310, while the electrical energy storage unit 110b is integrated into the electrical energy supply channel 320.

For purposes of illustration, each one of the electrical energy storage units 110a, 110b comprises the energy source 210, the power switching unit 230 with the power switching devices 230a, 230b, the driver enable stage 240, the switch driver unit 250, and the discharge control function unit 260 of FIG. 2. However, it should be noted that in accordance to the explanations above at FIG. 2, the respective configurations of these components are not further detailed at FIG. 4, as various different configurations are contemplated and readily available to the person skilled in the art.

Furthermore, in contrast to FIG. 2 the trigger source 270 with the safety switch 370 is now connected via the connection lines 372, 374 of FIG. 3 to the driver enable stages 240 of both electrical energy storage units 200, so that there is no dedicated trigger source 270 for each one of the electrical energy supply channels 310, 320. By way of example, the safety switch 370 is embodied in accordance with FIG. 2 as a manual switch which may connect the connection lines 372, 374 to ground 390.

Moreover, in contrast to FIG. 3 each one of the electrical energy supply channels 310, 320 now comprises a separate trigger source 280 with safety switch 380. Illustratively, the trigger source 280 of the electrical energy supply channel 310 is connected via the connection line 382 of FIG. 3 to the driver enable stage 240 of the electrical energy storage unit 200 of the electrical energy supply channel 310, and the trigger source 280 of the electrical energy supply channel 320 is connected via the connection line 384 of FIG. 3 to the driver enable stage 240 of the electrical energy storage unit 200 of the electrical energy supply channel 320. By way of example, the safety switches 380 are embodied in accordance with FIG. 2 as manual switches which may connect the connection lines 382, 384 to ground 390.

Figure 5:
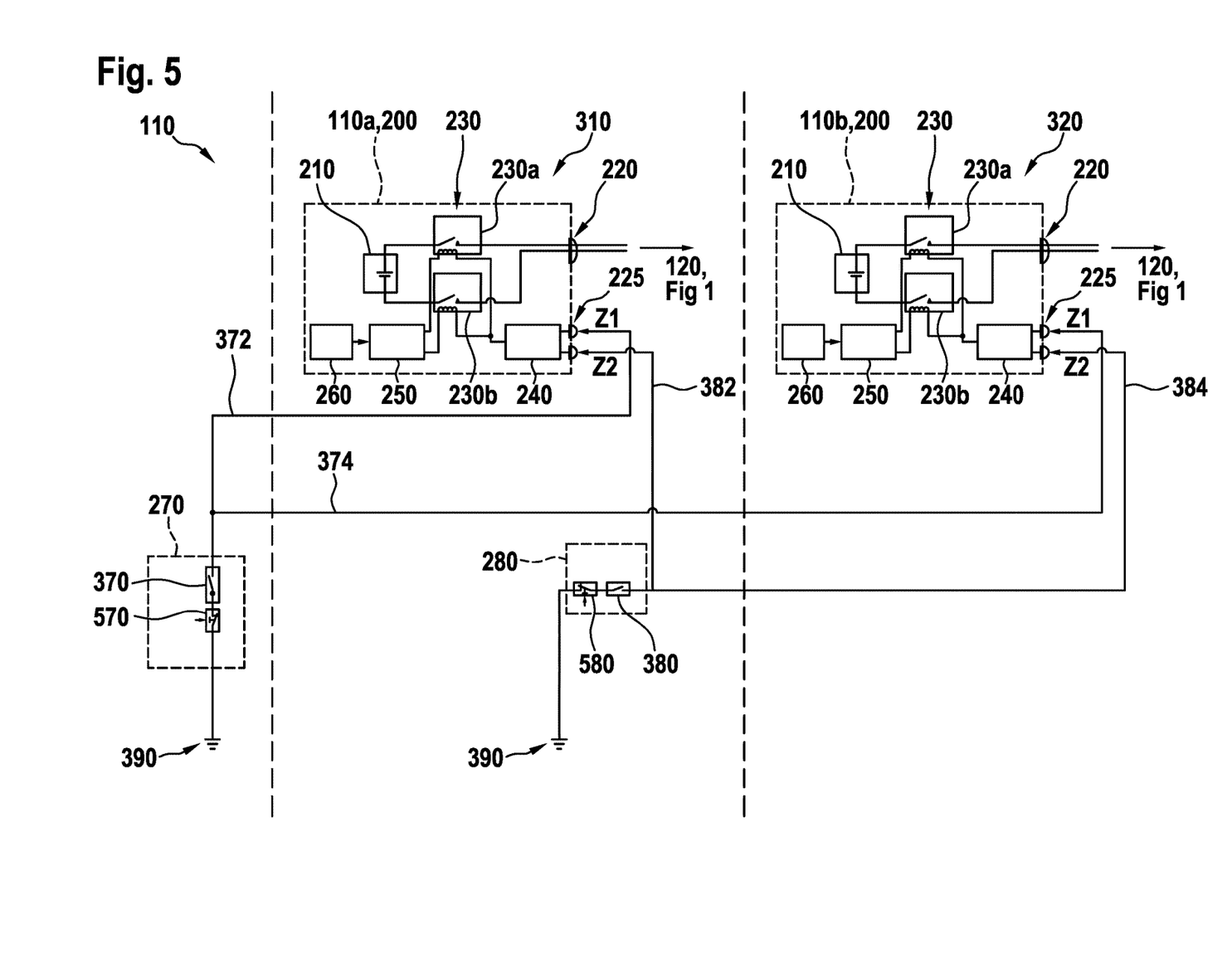
FIG. 5 shows an electrical energy storage system with two electrical energy supply channels according to a second variant.

FIG. 5 shows the electrical energy storage system 110 with the electrical energy storage units 110a, 110b of FIG. 4, which are illustratively connected to the electrical power distribution 120 of FIG. 1. Accordingly, each one of the electrical energy storage units 110a, 110b is embodied according to the electrical energy storage unit 200 of FIG. 2, the electrical energy storage unit 110a is integrated into the electrical energy supply channel 310 of FIG. 3, and the electrical energy storage unit 110b is integrated into the electrical energy supply channel 320 of FIG. 3.

Furthermore, the trigger sources 270, 280 with the safety switches 370, 380 of FIG. 4 are provided. However, in contrast to FIG. 4 now only a single trigger source 280 is provided and connected via the connection lines 382, 384 of FIG. 4 to the driver enable stages 240 of both electrical energy storage units 200, so that there is no dedicated trigger source 280 for each one of the electrical energy supply channels 310, 320.

Moreover, in contrast to FIG. 4, the trigger source 270 now preferably comprises an impact switch 570 and the trigger source 280 now preferably comprises an impact switch 580. Illustratively, the impact switch 570 is arranged between the safety switch 370, which is illustratively embodied as a manual switch, and ground 390. Similarly, the impact switch 580 is arranged between the safety switch 380, which is illustratively also embodied as a manual switch, and ground 390.

The impact switch 570 may be configured to switch in response to detection of an impact on the trigger source 270 e.g., the associated enable channels of the driver enable stages 240 of both electrical energy storage units 200 to disable mode, i.e., the enable channels 242a according to FIG. 2. Similarly, the impact switch 580 may be configured to switch in response to detection of an impact on the trigger source 280 e.g., the associated enable channels of the driver enable stages 240 of both electrical energy storage units 200 to disable mode, i.e., the enable channels 242b according to FIG. 2. For instance, an impact on the trigger source 270 and/or the trigger source 280 may occur as a result of an aircraft crash.

Figure 6:
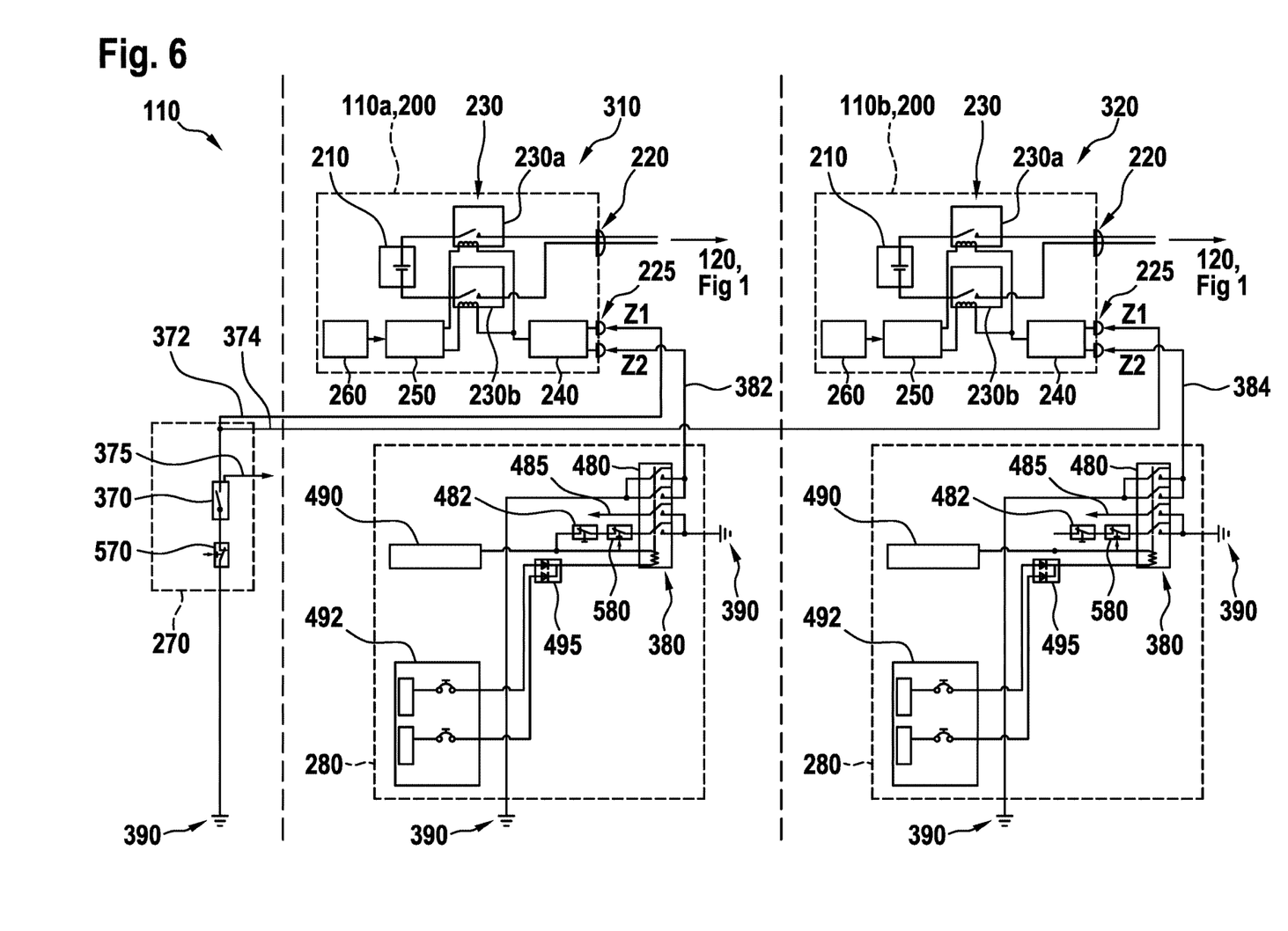
FIG. 6 shows an electrical energy storage system with two electrical energy supply channels according to a third variant.

FIG. 6 shows the electrical energy storage system 110 with the electrical energy storage units 110a, 110b of FIG. 4, which are illustratively connected to the electrical power distribution 120 of FIG. 1. Accordingly, each one of the electrical energy storage units 110a, 110b is embodied according to the electrical energy storage unit 200 of FIG. 2, the electrical energy storage unit 110a is integrated into the electrical energy supply channel 310, and the electrical energy storage unit 110b is integrated into the electrical energy supply channel 320. Furthermore, the trigger sources 270, 280 of FIG. 4 with the safety switches 370, 380 and impact switches 570, 580 according to FIG. 5 are provided.

However, in contrast to FIG. 4 now only the safety switch 370 is illustratively embodied as a manual switch, while the safety switches 380 are, by way of example, embodied as electro-mechanical switches and, more particularly, as safety relays 480. These safety relays 480 may be controlled by a discrete command unit 490, which may e.g., be embodied by means of a flight management system or protection logic of an aircraft to which the electrical energy storage system 110 is mounted, such as the eVTOL 100 of FIG. 1. Preferably, the discrete command unit 490 is configured to switch each one of the safety relays 480 between closed state and opened state on the basis of current operating conditions of the eVTOL 100. By way of example, the current operating conditions may encompass aircraft states and personal safety protection states. Furthermore, by way of example, each trigger source 280 may be provided with an associated manual release switch 482 and a safety circuit breaker panel 492 that is illustratively connected via a diode network 495 to the respective safety relay 480 such that the trigger sources 280 may be forced to disable mode, if required.

Moreover, according to one aspect the trigger source 270 may be provided with a signal monitoring line 375 and each trigger source 280 may be provided with a signal monitoring line 485. Thus, a current operating state of the trigger sources 270, 280 may easily and reliably be monitored.

It should be noted that modifications to the above described configurations are within the common knowledge of the person skilled in the art and, thus, also considered as being part of the present disclosure.

REFERENCE LIST 100 eVTOL
101 skid-type landing gear
102 fuselage
102a outer shell
102b fuselage internal volume
103 plurality of thrust producing units
103a, 103b thrust producing units
104 predetermined number of structural supports
104a, 104b structural supports
105 plurality of electrical engines
105a, 105b electrical engines
106 plurality of shroudings
106a, 106b shrouding
108 plurality of rotor assemblies
108a, 108b rotor assemblies
110 electrical energy storage system
110a, 110b electrical energy storage units
120 electrical power distribution
200 electrical energy storage unit
210 energy source
212a, 212b power supply lines
220 power interface
225 trigger interface
230 power switching unit
230a, 230b power switching devices
232a, 232b magnetic switches (e.g., contactors)
234a, 234b switch control coils (e.g., contactor coils)
236a, 236b coil return lines
240 driver enable stage
240a, 240b driver input channels
242a, 242b enable channels
250 switch driver unit
252a, 252b driver output lines
260 discharge control function unit
270, 280 trigger sources
310 first electrical energy supply channel
320 second electrical energy supply channel
370, 380 safety switches
372, 374 connection lines
375 signal monitoring line
382, 384 connection lines
390 ground
480 electromechanical switch
482 manual release switch
485 signal monitoring line
490 discrete command unit
492 safety circuit breaker panel
495 diode network
570, 580 impact switches

What is claimed is:

1. An electrical energy storage system for an aircraft, comprising at least one electrical energy storage unit with power supply lines and an energy source that is configured to store electrical energy and to supply electrical power at a predetermined voltage range via the power supply lines, wherein the at least one electrical energy storage unit comprises:
a power switching unit that is adapted to operate in an associated supply mode for supplying electrical power from the energy source via the power supply lines, and to operate in an associated disconnect mode for disconnecting the energy source from the power supply lines;
a driver enable stage that comprises at least a first enable channel and a second enable channel,
wherein each one of the first enable channel and the second enable channel is adapted to operate in one of an enable mode and a disable mode; and
a switch driver unit that is adapted to operate in one of an enable mode and a disable mode;
wherein the power switching unit is configured to operate in the supply mode if the switch driver unit and at least one of the first enable channel and the second enable channel are operated in enable mode, and
wherein the power switching unit is configured to operate in the disconnect mode if the switch driver unit is operated in disable mode, or if both the first enable channel and the second enable channel are operated in disable mode.

2. The electrical energy storage system of claim 1, further comprising:
a first trigger source that is connected to the first enable channel; and
a second trigger source that is connected to the second enable channel;

wherein the first trigger source is configured to switch the first enable channel between enable mode and disable mode; and wherein the second trigger source is configured to switch the second enable channel between enable mode and disable mode.

3. The electrical energy storage system of claim 2, wherein the first enable channel comprises a first diode, and the first trigger source comprises a first safety switch; and wherein the second enable channel comprises a second diode, and the second trigger source comprises a second safety switch.

4. The electrical energy storage system of claim 3, wherein the first enable channel is enabled if the first safety switch is in closed state, and disabled if the first safety switch is in opened state; and wherein the second enable channel is enabled if the second safety switch is in closed state, and disabled if the second safety switch is in opened state.

5. The electrical energy storage system of claim 4, wherein the second trigger source further comprises a discrete command unit; and wherein the second safety switch is a safety relay.

6. The electrical energy storage system of claim 5, wherein the discrete command unit is embodied by means of a flight management system or protection logic of an aircraft to which the electrical energy storage system is mounted.

7. The electrical energy storage system of claim 5, wherein the discrete command unit is configured to switch the safety relay between closed state and opened state on the basis of current operating conditions of an aircraft to which the electrical energy storage system is mounted.

8. The electrical energy storage system of claim 2, wherein the first trigger source further comprises an impact switch that is configured to switch the first enable channel to disable mode in response to detection of an impact on the first trigger source.

9. The electrical energy storage system of claim 2, wherein the second trigger source further comprises an impact switch that is configured to switch the second enable channel to disable mode in response to detection of an impact on the second trigger source.

10. The electrical energy storage system of claim 1, further comprising a discharge control function unit that is connected to the switch driver unit and adapted to command the switch driver unit to operate either in enable mode or disable mode.

11. The electrical energy storage system of claim 10, wherein the discharge control function unit is configured to command the switch driver unit on the basis of predetermined operating conditions of an aircraft to which the electrical energy storage system is mounted.

12. The electrical energy storage system of claim 10, wherein the discharge control function unit is embodied by means of a battery management system associated with the energy source.

13. The electrical energy storage system of claim 1, wherein the power switching unit comprises at least one power switching device with a magnetic switch and an associated switch control coil;

wherein the magnetic switch is arranged in one of the power supply lines; and wherein the associated switch control coil is connected to the switch driver unit, the first enable channel, and the second enable channel.

14. The electrical energy storage system of claim 13, wherein the magnetic switch is closed in supply mode of the power switching unit by means of the associated switch control coil.

15. An aircraft with an electrical energy storage system according to claim 1.

16. The electrical energy storage system of claim 2, wherein the first enable channel comprises a first circuitry, and the first trigger source comprises a first safety switch; and wherein the second enable channel comprises a second circuitry, and the second trigger source comprises a second safety switch.

17. An electrical energy storage system for an aircraft, the electrical energy storage system comprising:

an electrical energy storage unit with power supply lines and an energy source configured to store electrical energy and to supply electrical power at a predetermined voltage range via the power supply lines, wherein the electrical energy storage unit comprises:

a power switching unit adapted to operate in an associated supply mode for supplying electrical power from the energy source via the power supply, and to operate in an associated disconnect mode for disconnecting the energy source from the power supply;

a driver enable stage comprising a first enable channel and a second enable channel, with one of the first enable channel and the second enable channel adapted to operate in one of an enable mode and a disable mode; and a switch driver unit adapted to operate in one of an enable mode and a disable mode;

wherein the power switching unit is configured to operate in the supply mode if the switch driver unit and at least one of the first enable channel and the second enable channel are operated in enable mode, and wherein the power switching unit is configured to operate in the disconnect mode if the switch driver unit is operated in disable mode, or if both the first enable channel and the second enable channel are operated in disable mode.

18. The electrical energy storage system of claim 17, further comprising:

a first trigger source connected to the first enable channel; and a second trigger source connected to the second enable channel;

wherein the first trigger source is configured to switch the first enable channel between enable mode and disable mode; and wherein the second trigger source is configured to switch the second enable channel between enable mode and disable mode.

19. The electrical energy storage system of claim 18, wherein the first enable channel comprises a first diode, and the first trigger source comprises a first safety switch; and wherein the second enable channel comprises a second diode, and the second trigger source comprises a second safety switch, wherein the first enable channel is enabled if the first safety switch is in closed state, and disabled if the first safety switch is in opened state; and wherein the second enable channel is enabled if the second safety switch is in closed state, and disabled if the second safety switch is in opened state.

20. An electrical energy storage system for an aircraft, the electrical energy storage system comprising:

an electrical energy store with power supply lines and an energy source configured to store electrical energy and to supply electrical power at a predetermined voltage range via the power supply lines, wherein the electrical energy store comprises:

a power switch adapted to operate in an associated supply mode for supplying electrical power from the energy source via the power supply, and to operate in an associated disconnect mode for disconnecting the energy source from the power supply;

a driver enable stage comprising a first enable channel and a second enable channel, with one of the first enable channel and the second enable channel adapted to operate in one of an enable mode and a disable mode; and a switch driver operable in one of an enable mode and a disable mode;

wherein the power switch is operable in the supply mode if the switch driver and at least one of the first enable channel and the second enable channel are operated in enable mode, and wherein the power switch is operable in the disconnect mode if the switch driver is operated in disable mode, or if both the first enable channel and the second enable channel are operated in disable mode.

* * * * *